United States Patent
Xu et al.

(10) Patent No.: US 10,289,906 B2
(45) Date of Patent: May 14, 2019

(54) ASSOCIATION METHOD AND ASSOCIATION APPARATUS TO OBTAIN IMAGE DATA BY AN IMAGING APPARATUS IN A VIEW AREA THAT IS DIVIDED INTO MULTIPLE SUB-VIEW AREAS

(71) Applicant: Beijing Zhigu Rui Tuo Tech Co., Ltd, Beijing (CN)

(72) Inventors: Ran Xu, Beijing (CN); Wei Shi, Beijing (CN)

(73) Assignee: BEJING ZHIGU RUI TUO TECH CO., LTD, Beijing (CN)

( * ) Notice: Subject to any disclaimer, the term of this patent is extended or adjusted under 35 U.S.C. 154(b) by 134 days.

(21) Appl. No.: 15/305,347

(22) PCT Filed: Apr. 16, 2015

(86) PCT No.: PCT/CN2015/076712
§ 371 (c)(1),
(2) Date: Oct. 19, 2016

(87) PCT Pub. No.: WO2015/161750
PCT Pub. Date: Oct. 29, 2015

(65) Prior Publication Data
US 2017/0053154 A1    Feb. 23, 2017

(30) Foreign Application Priority Data
Apr. 21, 2014    (CN) .......................... 2014 1 0160205

(51) Int. Cl.
*G06K 9/00*    (2006.01)
*G06F 9/451*    (2018.01)
(Continued)

(52) U.S. Cl.
CPC ............. *G06K 9/0057* (2013.01); *G06F 3/00* (2013.01); *G06F 9/4443* (2013.01); *G06F 9/451* (2018.02);
(Continued)

(58) Field of Classification Search
CPC ....... G06K 19/0723; G06K 2017/0045; G06K 7/1097; G06K 9/32; G06K 9/62; A63B 2225/54
See application file for complete search history.

(56) References Cited

U.S. PATENT DOCUMENTS 7,154,395 B2    12/2006 Raskar
8,614,753 B2    12/2013 Ko et al.
(Continued)

FOREIGN PATENT DOCUMENTS

| CN | 102356371 A | 2/2012 |
| CN | 103942515 A | 7/2014 |

(Continued)

OTHER PUBLICATIONS

International Search Report for PCT Application No. PCT/CN2015/076712, dated Jul. 22, 2015, 3 pages.

*Primary Examiner* — Li Liu
(74) *Attorney, Agent, or Firm* — Amin, Turocy & Watson, LLP

(57) ABSTRACT

An association relating to the field of communications is enabled. A method comprises: acquiring image data in a view area of an imaging apparatus; dividing the view area into sub-view areas; acquiring an attribute information set of at least one object in any one sub-view area through beam scanning; establishing a correspondence between the attribute information set and image data corresponding to the one sub-view area; and acquiring, in response to that the attribute information set comprises attribute information of
(Continued)

multiple objects, distance related information between the multiple objects and a beam emitting position. An accurate correspondence can be established between an object in a view area of an imaging apparatus and attribute information of the object, and with multiple objects, distance related information between the objects and a beam emitting position is acquired, which helps to further determine a correspondence between each object and corresponding attribute information.

25 Claims, 13 Drawing Sheets

(51) Int. Cl.
G06F 3/00 (2006.01)
G06F 9/44 (2018.01)
G06Q 10/00 (2012.01)
H04N 1/00 (2006.01)

(52) U.S. Cl.
CPC ............... G06K 9/00 (2013.01); G06Q 10/00 (2013.01); H04N 1/00236 (2013.01)

(56) References Cited

U.S. PATENT DOCUMENTS

| | | | |
|---|---|---|---|
| 8,810,401 B2 | 8/2014 | Karttaavi | |
| 2005/0128293 A1* | 6/2005 | Wilsey | G06K 7/10079 348/143 |
| 2008/0315772 A1 | 12/2008 | Knibbe | |
| 2009/0147025 A1* | 6/2009 | Grigsby | H04N 21/2187 345/633 |
| 2009/0322489 A1* | 12/2009 | Jones | G06K 9/00771 340/10.3 |
| 2012/0007772 A1* | 1/2012 | Parssinen | G06F 3/013 342/176 |
| 2012/0224076 A1* | 9/2012 | Niedermeyer | G06K 7/01 348/211.2 |
| 2013/0049925 A1* | 2/2013 | Subramanian | G06K 7/10079 340/3.1 |
| 2013/0063567 A1* | 3/2013 | Burns | G08B 13/248 348/46 |
| 2013/0082877 A1* | 4/2013 | Kamaya | G01S 13/874 342/451 |
| 2013/0271606 A1* | 10/2013 | Chiang | H04N 7/183 348/148 |
| 2014/0079282 A1* | 3/2014 | Marcheselli | G06K 9/00335 382/103 |
| 2014/0183269 A1* | 7/2014 | Glaser | G06F 21/32 235/492 |
| 2015/0081090 A1* | 3/2015 | Dong | B07C 5/3422 700/230 |
| 2015/0302027 A1* | 10/2015 | Wnuk | G06F 17/30268 382/305 |
| 2017/0056783 A1* | 3/2017 | Akavia | H04N 5/225 |
| 2017/0216714 A1* | 8/2017 | Maharbiz | A63F 3/00643 |

FOREIGN PATENT DOCUMENTS

| | | |
|---|---|---|
| WO | 2006004192 A1 | 1/2006 |
| WO | 2007072285 A1 | 6/2007 |

* cited by examiner

| Sub-view area | Object number | Attribute information | Sub-display area |
|---|---|---|---|
| S11 | \ | \ | R11 |
| S12 | 222; 223 | URL1; Shelf life 1 year | R12 |
| S13 | \ | \ | R13 |
| S14 | \ | \ | R14 |
| S15 | \ | \ | R15 |
| S16 | \ | \ | R16 |
| S21 | \ | \ | R21 |
| S22 | \ | \ | R22 |
| S23 | \ | \ | R23 |
| S24 | \ | \ | R24 |
| S25 | 221 | a manufacturer, b address of manufacturer | R25 |
| S26 | \ | \ | R26 |
| S31 | \ | \ | R31 |
| S32 | \ | \ | R32 |
| S33 | \ | \ | R33 |
| S34 | \ | \ | R34 |
| S35 | \ | \ | R35 |
| S36 | \ | \ | R36 |

FIG. 4b

ABSTRACT METHOD AND
ASSOCIATION APPARATUS TO OBTAIN
IMAGE DATA BY AN IMAGING APPARATUS
IN A VIEW AREA THAT IS DIVIDED INTO
MULTIPLE SUB-VIEW AREAS

RELATED APPLICATION

The present application is a U.S. National Stage filing under 35 U.S.C. § 371 of international patent cooperation treaty (PCT) application No. PCT/CN2015/076712, filed Apr. 16, 2015, and entitled "ASSOCIATION METHOD AND ASSOCIATION APPARATUS", which claims the benefit of priority to Chinese Patent Application No. 201410160205.6, filed on Apr. 21, 2014, which applications are hereby incorporated into the present application by reference herein in their respective entireties.

TECHNICAL FIELD

The present application relates to the field of communications technologies, and in particular to an association method and an association apparatus.

BACKGROUND

With the development of electronic apparatuses, photographing apparatuses such as portable cameras, single-lens reflex cameras, and smartphones become popular gradually. People may conveniently use these photographing apparatuses for photographing, and people's lives are greatly enriched.

In the meantime, with the development of the Internet of Things technology, Radio Frequency Identification (RFID) tags are applied more often in commodities. However, information in these RFID tags generally is read by using dedicated RFID readers. Therefore, a camera having a function of reading a RFID tag is proposed. For such a camera, when multiple objects having an RFID tag exist in the view of the camera, the camera cannot establish accurate correspondences between the objects and information in the RFID tags, causing the user experience to be affected.

SUMMARY

An example objective of the present application is to provide an association method and an association apparatus.

According to one example aspect of at least one embodiment of the present application, an association method is provided, where the method comprises:
acquiring image data in a view area of an imaging apparatus;
dividing the view area into multiple sub-view areas;
acquiring an attribute information set of at least one object in any one sub-view area of the multiple sub-view areas through beam scanning;
establishing a correspondence between the attribute information set and image data corresponding to the one sub-view area;
determining whether the attribute information set comprises the attribute information of multiple objects; and
acquiring, in response to that the attribute information set comprises attribute information of multiple objects, distance related information between the multiple objects and a beam emitting position.

According to another example aspect of at least one embodiment of the present application, an association apparatus is provided, where the association apparatus comprises:
an image data acquisition module, configured to acquire image data in a view area of an imaging apparatus;
a view area division module, configured to divide the view area into multiple sub-view areas;
an attribute information set acquisition module, configured to acquire an attribute information set of at least one object in any one sub-view area of the multiple sub-view areas through beam scanning;
a correspondence establishment module, configured to establish a correspondence between the attribute information set and image data corresponding to the one sub-view area;
a determination module, configured to determine whether the attribute information set comprises the attribute information of multiple objects; and
a distance related information acquisition module, configured to acquire, in response to that the attribute information set comprises attribute information of multiple objects, distance related information between the multiple objects and a beam emitting position.

BRIEF DESCRIPTION OF THE DRAWINGS

FIG. 4b is an example schematic diagram of a correspondence between attribute information of an object in a sub-view area and image data corresponding to the sub-view area in an embodiment of the present application.

DETAILED DESCRIPTION

The example embodiments of the present application are further described in detail with reference to the accompanying drawings and embodiments below. The embodiments below are used for describing the present application rather than to limit the scope of the present application.

Persons skilled in the art understand that in the embodiments of the present application, the serial number of each procedure described above does not mean an execution sequence, and the execution sequence of each procedure should be determined according to the function and internal logic thereof, and should not constitute any limitation on the implementation procedure of the embodiments of the present application.

Figure 1:
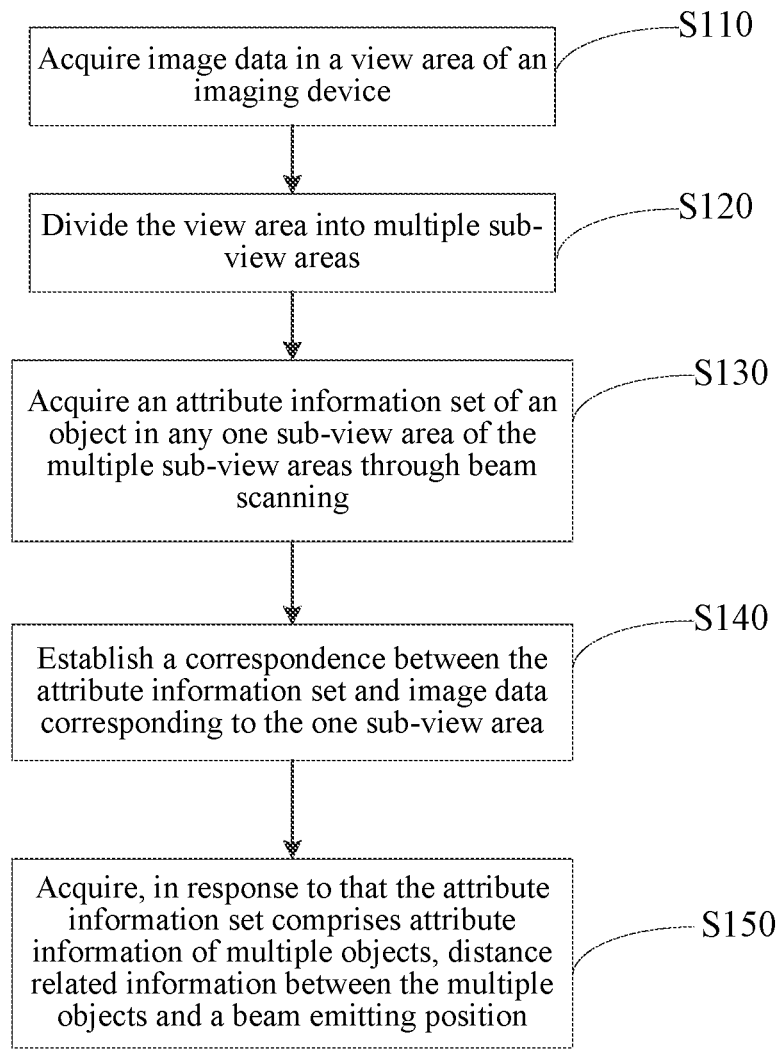
FIG. 1 is an example flowchart of an association method in an embodiment of the present application.

FIG. 1 is a flowchart of an association method in an embodiment of the present application. The association method may be implemented on, for example, an association apparatus. As shown in FIG. 1, the method comprises:

S110: Acquire image data in a view area of an imaging apparatus.

S120: Divide the view area into multiple sub-view areas.

S130: Acquire an attribute information set of at least one object in any one sub-view area of the multiple sub-view areas through beam scanning.

S140: Establish a correspondence between the attribute information set and image data corresponding to the one sub-view area.

S150: Acquire, in response to that the attribute information set comprises attribute information of multiple objects, distance related information between the multiple objects and a beam emitting position.

In a method in an example embodiment of the present application, in one aspect image data in a view area of an imaging apparatus is acquired; in another aspect, the view area is divided to obtain multiple sub-view areas, and any one sub-view area is scanned by using a beam to acquire an attribute information set of at least one object in the sub-view area, so as to further establish a correspondence between the attribute information set of the at least one object in the one sub-view area and image data corresponding to the one sub-view area; therefore, while image data of the at least one object is acquired, the attribute information set of the at least one object is correspondingly acquired, and the correspondence between the image data and the attribute information set is highly accurate. Moreover, in the method, in a case where the attribute information set comprises attribute information of multiple objects, distance related information between the multiple objects and a beam emitting position is further acquired, and the distance related information helps to further determine a correspondence between each object and corresponding attribute information.

The functions of Steps S110, S120, S130, S140, and S150 are described in detail below with reference to example embodiments.

S110: Acquire image data in a view area of an imaging apparatus.

Figure 2:
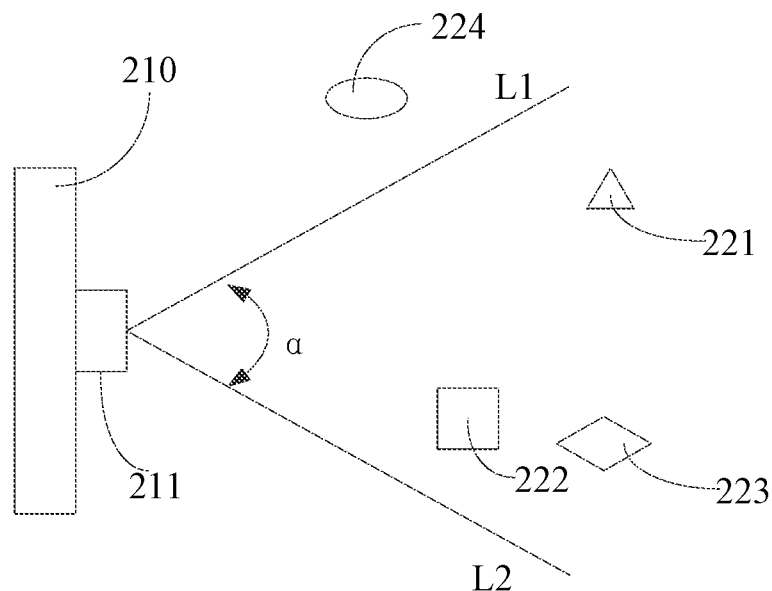
FIG. 2 is an example schematic sectional view of a view area in an embodiment of the present application.

The imaging apparatus may comprise, for example, a camera or a charge-coupled apparatus (CCD). The imaging apparatus may be comprised in the association apparatus, or may be disposed independently from the association apparatus. The view area may generally be determined by a view parameter such as a focal length or view angle of the imaging apparatus. FIG. 2 is a schematic sectional view of the view area, where the imaging apparatus 210 comprises a camera 211. When a view angle of the camera 211 is $\alpha$, correspondingly L1 may represent an upper boundary of the view area, and L2 may represent a lower boundary of the view area. In addition, FIG. 2 is a schematic sectional view obtained by horizontally sectioning the view area by using a vertical plane comprising a central axis of the camera. A person skilled in the art understands that a spatial structure of the view area is a three-dimensional structure similar to a cone. In FIG. 2, a first object 221, a second object 222, and a third object 223 are located inside the view area, and a fourth object 224 is located outside the view area. In addition, a person skilled in the art understands that the view area may also be determined according to the focal length of the imaging apparatus, which is no longer elaborated here.

The acquired image data may be a photo or a video obtained through photographing with the imaging apparatus, or may also be an image presented on a display screen of the imaging apparatus before a photo or a video is obtained.

S120: Divide the view area into multiple sub-view areas.

Figure 3:
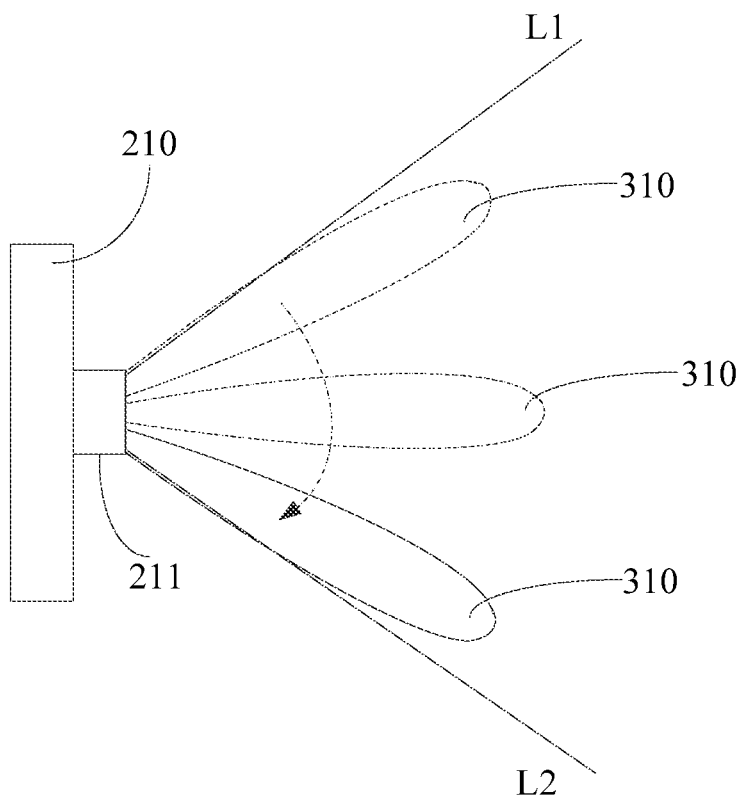
FIG. 3 is an example schematic diagram of sub-view areas after division in an embodiment of the present application.

As shown in FIG. 3, the view area (an area between L1 and L2 in FIG. 3) may be divided into multiple sub-view areas 310. Each sub-view area 310 approximately has a cone form. A person skilled in the art understands that image data corresponding to each sub-view area 310 is a part of image data in the view area. In addition, to enable the sub-view areas 310 to cover the view area desirably, that is, to enable a beam hereinafter to completely scan the entire view area, in an aspect, an overlapped area may exist between different sub-view areas 310, and in another aspect, a granularity as fine as possible can be chosen to divide the view area, the reason being that for a given view area, when the number of the sub-view areas 310 obtained through division is larger, the effect of coverage is better. Therefore, the number of the sub-view areas 310 is at least two, and to avoid a case of a miss during scanning, the number of the sub-view areas 310 can be as large as possible.

S130: Acquire an attribute information set of at least one object in any one sub-view area of the multiple sub-view areas through beam scanning.

In an example embodiment, Step S130 specifically comprises:

S131: Scan the one sub-view area by using a directed beam.

S132: Receive attribute information fed back by the at least one object in the one sub-view area according to the scanning of the directed beam, so as to obtain the attribute information set of the at least one object in the one sub-view area.

In Step S131, the directed beam may be formed by using a beamforming technology. Beamforming is a combination of an antenna technology and a digital signal processing technology, and has an objective of transmitting or receiving a directed signal. In an example embodiment, each sub-view area may be scanned in order by using one directed beam. As shown in FIG. 3, each sub-view area 310 may be scanned in order from top to bottom in a direction of the arrow. In another example embodiment, multiple directed beams may be controlled to scan multiple sub-view areas synchronously.

In addition, a coverage area (that is, an area covered by a single time of scanning by a single directed beam) of the directed beam corresponds to the sub-view area. Therefore, to ensure a desirable scanning coverage effect for the entire view area, an area covered by a single time of scanning by the directed beam can be as small as possible, which may be implemented by increasing the number of transmit antennas of the directed beam.

In Step S132, the attribute information fed back by the at least one object in the one sub-view area according to the scanning of the directed beam may be received through a wireless network. The at least one object in the one sub-view area refers to at least one object that is partially or entirely located in the one sub-view area. In other words, at least a part of any one of the at least one object is located in the one sub-view area.

In an example embodiment, the wireless network comprises at least one of a Wireless Fidelity (Wi-Fi) network, a Bluetooth network, a ZigBee network, a Wireless Broadband (WiBro) network, and a cellular network, and a communications module is disposed on any one object of the at least one object. In response to that the communications module receives the directed beam, the communications module sends, to the association apparatus, attribute information of the one object stored in the communications module. In such a case, the at least one object in one sub-view area refers to at least one object whose communications module is located in the one sub-view area. In the present application, the attribute information may be related information such as a name, a code, an address of manufacturer, and a date of manufacture of the object, or may also be address information corresponding to the at least one object. According to the address information, the association apparatus may raise a query to acquire more detailed information of the at least one object.

In an example embodiment, the wireless network is an RFID network, and an RFID electronic tag is disposed on the object. In response to that the RFID electronic tag receives the directed beam, the RFID electronic tag sends, to the association apparatus, attribute information of the one object stored in the RFID electronic tag. In such a case, the at least one object in one sub-view area refers to at least one object whose RFID electronic tag is located in the one sub-view area.

In response to that the sub-view area comprises one object, the attribute information set comprises attribute information of the one object. That is, the attribute information set comprises one attribute information element. In response to that the sub-view area comprises multiple objects, the attribute information set comprises attribute information of the multiple objects. That is, the attribute information set comprises multiple attribute information elements. In response to that the sub-view area does not comprise an object, the attribute information set does not comprise attribute information of the object. That is, the attribute information set is an empty set.

S140: Establish a correspondence between the attribute information set and image data corresponding to the one sub-view area.

An example in which the wireless network is an RFID network is used. The RFID electronic tag may be an active electronic tag, or may also be a passive electronic tag, and has a very small size generally in a millimeter level. Therefore, in a case where the coverage area of the directed beam is sufficiently small, the tag may be scanned in a sufficiently small sub-view area and the attribute information may be received, whereas the attribute information cannot be received in a case of scanning outside the sub-view area, to cause an association to be accurately established between an attribute information set of at least one object in an sub-view area and the sub-view area. In addition, the sub-view area corresponds to a part of image data, to cause a correspondence between an attribute information set of at least one object in the sub-view area and image data corresponding to the sub-view area to be obtained.

Generally, the volume of an object is far larger than that of the tag. It is assumed that a sectional area of the sub-view area in a direction perpendicular to scanning is slightly greater than a sectional area of the tag. Therefore, image data corresponding to the sub-view area is a part of image data of the at least one object. According to a correspondence between the attribute information set and the image data corresponding to the sub-view area, a correspondence between the image data of the at least one object and the attribute information set may be directly obtained. Moreover, compared with establishment of a correspondence between image data of an object and attribute information of the object by using a Global Positioning System (GPS) positioning technology, in the method of the present application, a problem of low precision of GPS positioning does not exist, and therefore, accuracy is higher. Compared with establishment of a correspondence between image data of an object and attribute information of the object in a manner of computing a focusing position, because the volume of a tag is far smaller than that of an object, an error range in the present application generally does not exceed a range of image data of an object, and therefore, accuracy is higher.

Figure 4A:
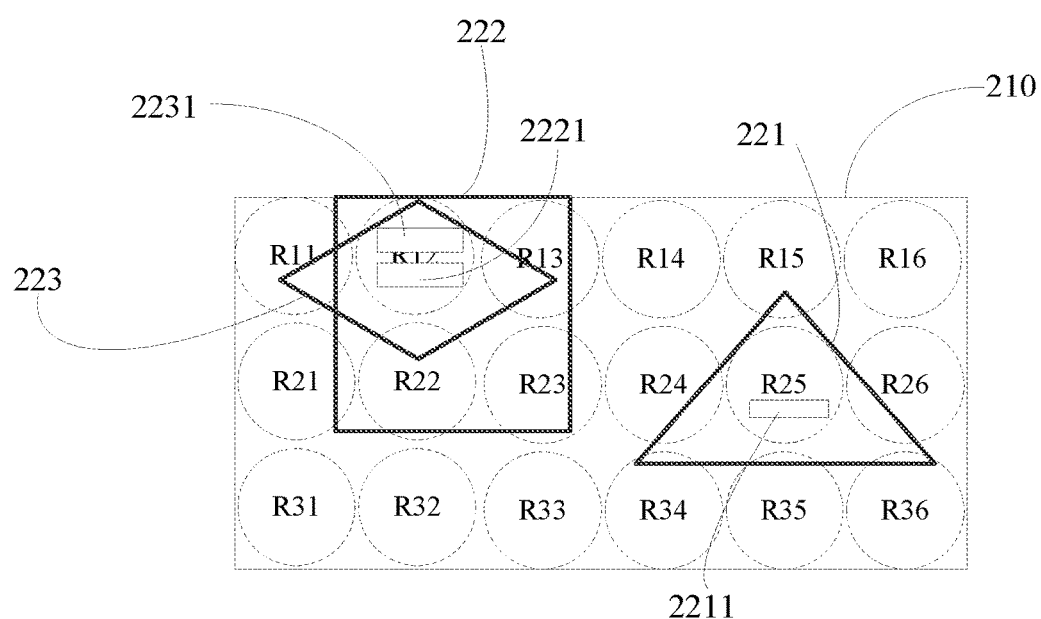
FIG. 4a is an example schematic diagram of sub-display areas in an embodiment of the present application.

Referring to FIG. 4a, corresponding to the sub-view area, the display screen of the imaging apparatus 210 may be divided into multiple sub-display areas. As shown in FIG. 4a, the display screen is divided into 18 sub-display areas R11 to R36. It is assumed that the 18 sub-display areas separately correspond to 18 sub-view areas whose numbers are S11 to S36 (not shown). Moreover, it is assumed that an RFID electronic tag (or communications module) 2211 of the first object 221 is located in the sub-view area 25, an RFID electronic tag (or communications module) 2221 of the second object 222 is located in the sub-view area 12, and an RFID electronic tag (or communications module) 2231 of the third object 223 is also located in the sub-view area 12. In the meantime, it may be seen from FIG. 4a that image data of the first object 221 covers image data in the sub-display area R25, image data of the second object 222 covers image data in the sub-display area R12, image data of the third object 223 covers image data in the sub-display area R12, and the image data of the second object 222 further partially covers image data in the third object 223. For simplicity, sub-display areas in FIG. 4a are all shown by a circle; however, a person skilled in the art understands that the sub-display area at an edge of the display screen can be an ellipse, in which a ratio of the major axis to the minor axis is greater than 1, the sub-display area at a central position of the display screen is a circle, in which a ratio of the major axis to the minor axis is 1, and from an edge of the display screen to the center of the display screen, a ratio of the major axis to the minor axis of an ellipse corresponding to the sub-display area gradually decreases, that is, gradually approximates 1.

Specifically, the correspondences may be shown in FIG. 4b. A record in the 11th row in FIG. 4b represents that the RFID tag 2211 of the first object 221 is located in the sub-view area 25, attribute information of the first object 221 is "a manufacturer, b address of manufacturer", and the sub-view area 25 corresponds to the sub-display area R25, to cause a correspondence between an attribute information set comprising the attribute information "a manufacturer, b address of manufacturer" of the first object 221 and image data in the sub-display area R25 to be obtained.

A record in the 2nd row in FIG. 4*b* represents that the RFID tag 2221 of the second object 222 and the RFID tag 2231 of the third object 223 are both located in the sub-view area 12, attribute information of the second object 222 is "URL1", attribute information of the third object 223 is "shelf life 1 year", and the sub-view area 12 corresponds to the sub-display area R12, to cause a correspondence between an attribute information set comprising both the attribute information "URL1" of the second object 222 and the attribute information "shelf life 1 year" of the third object 223 and image data in the sub-display area R12 to be obtained.

S150: Acquire, in response to that the attribute information set comprises attribute information of multiple objects, distance related information between the multiple objects and a beam emitting position.

As discussed above, the attribute information set may comprise multiple attribute information elements, that is, comprise attribute information of multiple objects. In the record shown in the 2nd row in FIG. 4*b*, the attribute information set of the object in the sub-view area 12 comprises attribute information of two objects. The method may further comprise: determining, according to the number of pieces of the attribute information in the attribute information set, whether the attribute information set comprises the attribute information of multiple objects. For example, when the number of pieces of attribute information in the attribute information set is greater than or equal to 2, it is regarded that the attribute information set comprises attribute information of multiple objects.

In a case where the attribute information set comprises attribute information of multiple objects, the attribute information of the multiple objects at the same time corresponds to image data corresponding to the one sub-view area, which may confuse a user that the user cannot determine which piece of attribute information corresponds to which object. Therefore, in this step, distance related information between the multiple objects and a beam emitting position is further acquired, and according to the distance related information, the attribute information of multiple objects in the one sub-view area may be further distinguished in a direction along the directed beam. The distance related information may be a distance relationship of the multiple objects to the beam emitting position, for example, that a distance between one object and the beam emitting position is greater than a distance between another object and the beam emitting position, or one object is in front of another object; or, the distance related information may also be distance values from the multiple objects to the beam emitting position.

In an example embodiment, the distance related information between the multiple objects and the beam emitting position may be acquired according to Received Signal Strength Indications (RSSIs) separately corresponding to the attribute information of the multiple objects.

Figure 5:
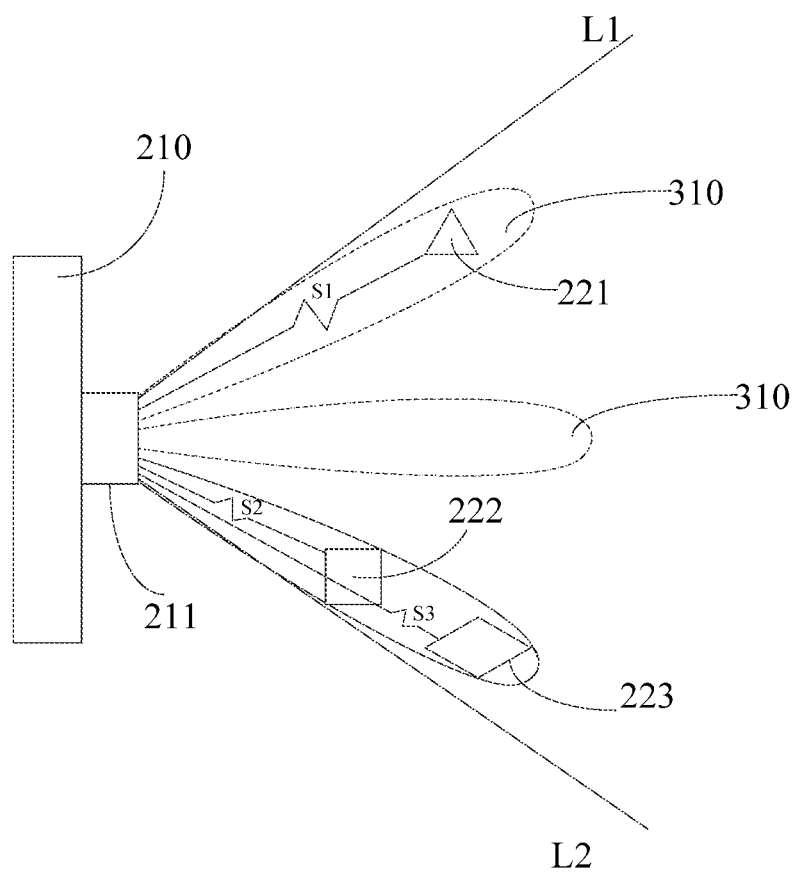
FIG. 5 is an example schematic diagram of feedback of attribute information by objects according to beam scanning in an embodiment of the present application.

It is assumed that an RFID tag is disposed on the object and it is assumed that the RFID tag is a passive tag. In response to that the RFID tag receives the directed beam, the passive RFID tag feeds back corresponding attribute information by using energy of the received directed beam. As shown in FIG. 5, it is assumed that the first object 221 receives the directed beam along a path 51 and feeds back attribute information of the first object 221 in an opposite direction along the directed beam, and it is assumed that a distance of the path 51 is D1. The second object 222 receives the directed beam along a path S2 and feeds back the attribute information of the second object 222 in an opposite direction along the directed beam, and it is assumed that a distance of the path S2 is D2. The third object 223 receives the directed beam along a path S3 and feeds back attribute information of the third object 223 in an opposite direction along the directed beam, and it is assumed that a distance of the path S3 is D3. It may be seen that because the distance D3 between the third object 223 and the beam emitting position is greater than the distance D2 between the second object 222 and the beam emitting position, energy of the directed beam received by the third object 223 is less than energy of the directed beam received by the second object 222, which results in that emission power of a feedback signal of the third object 223 is less than emission power of a feedback signal of the second object 222. Similarly, because the distance D3 between the third object 223 and the beam emitting position is greater than the distance D2 between the second object 222 and the beam emitting position, an energy loss of the feedback signal of the third object 223 is greater than an energy loss of the feedback signal of the second object 222. The difference between the emission power of the feedback signals of the third object 223 and the second object 222 and the energy loss of the feedback signals eventually result in that an RSSI corresponding to the attribute information of the third object 223 is obviously less than an RSSI corresponding to the attribute information of the second object 222.

In this way, a distance between each object and a beam emitting position may be directly reflected according to an RSSI corresponding to attribute information of the object. Accordingly, in the method, distance relationships of multiple objects to a beam emitting position may be determined according to RSSIs separately corresponding to attribute information of the multiple objects. Certainly, in the method, corresponding distance values may further be obtained through computation according to the RSSIs separately corresponding to the attribute information of the multiple objects.

In addition, a person skilled in the art understands that in a case where the RFID tag is an active tag, or, the object feeds back attribute information of the object by using a wireless communications module, as long as the active tag or wireless communications module feeds back attribute information of the active tag or wireless communications module by using same emission power, because of different distances of feedback paths, in the method, the distance related information between the multiple objects and the beam emitting position may still be acquired according to the RSSIs separately corresponding to the attribute information of the multiple objects.

In another example embodiment, the distance related information between the multiple objects and the beam emitting position may be acquired according to reception delays separately corresponding to the attribute information of the multiple objects.

In the method, a moment of emitting a directed beam may be recorded as an emitting moment, and a moment of receiving attribute information of an object may be recorded as a receiving moment, and a reception delay of the attribute information of the object is obtained through computation according to a difference value between the receiving moment and the emitting moment. Still referring to FIG. 5, a reception delay corresponding to the attribute information of the second object 222 is approximately equal to a time it takes an electromagnetic wave to travel a distance twice as long as the distance D2, and a reception delay corresponding to the attribute information of the third object 223 is approximately equal to a time it takes an electromagnetic wave to travel a distance twice as long as the distance D3. Because D2 is less than D3, the reception delay corresponding to the attribute information of the second object 222 is less than the reception delay corresponding to the attribute information of the third object 223.

In this way, a distance between each object and a beam emitting position may be directly reflected according to a reception delay corresponding to attribute information of the object. Accordingly, in the method, a distance relationship of multiple objects to a beam emitting position may be determined according to reception delays separately corresponding to attribute information of the multiple objects. Certainly, in the method, corresponding distance values may further be obtained through computation according to the reception delays separately corresponding to the attribute information of the multiple objects.

In another example embodiment, the acquiring distance related information between the multiple objects and a beam emitting position comprises:

S151: Adjust emission power of the beam for scanning the one sub-view area.

S152: Acquire, according to a condition of receiving the attribute information of the multiple objects in an adjustment process, the distance related information between the multiple objects and the beam emitting position.

A scanning distance of the beam depends on emission power of the beam. When the beam has higher emission power, the scanning distance is larger, and when the beam has lower emission power, the scanning distance is smaller. Therefore, in this example embodiment, the emission power of the beam may be adjusted incrementally by a predetermined step length. In this way, if multiple objects exist in a scanned sub-view area, an object having a shortest distance is first scanned, and an object having a slightly greater distance is scanned slightly later, and an object having the greatest distance is scanned last. Similarly, if the emission power of the beam is adjusted decrementally by a predetermined step length, and in this way, if multiple objects exist in the scanned sub-view area, at first all objects in the sub-view area may be scanned, and an object slightly farther is no longer scanned, and eventually only the nearest object can be scanned. Therefore, a distance relationship between the multiple objects and the beam emitting position may be determined according to a sequence in which the attribute information can be received (or cannot be received). At the same time, according to emission power that an object is just scanned, a specific distance value of the object may be obtained through computation.

Still referring to FIG. 5, it is assumed that emission power of a beam for scanning a sub-view area where the second object 222 and the third object 223 are located is adjusted incrementally by a predetermined step length. In a case where the emission power of the beam is very low, no object is scanned, and no attribute information is fed back. After the emission power of the beam is gradually increased, the second object 222 is scanned, and accordingly the attribute information of the second object 222 is received. After the emission power of the beam is increased again, the second object 222 and the third object 223 are scanned, and accordingly attribute information of the second object 222 and the third object 223 is received. Therefore, it may be determined that a distance between the second object 222 and the beam emitting position is less than a distance between the third object 223 and the beam emitting position.

Figure 6:
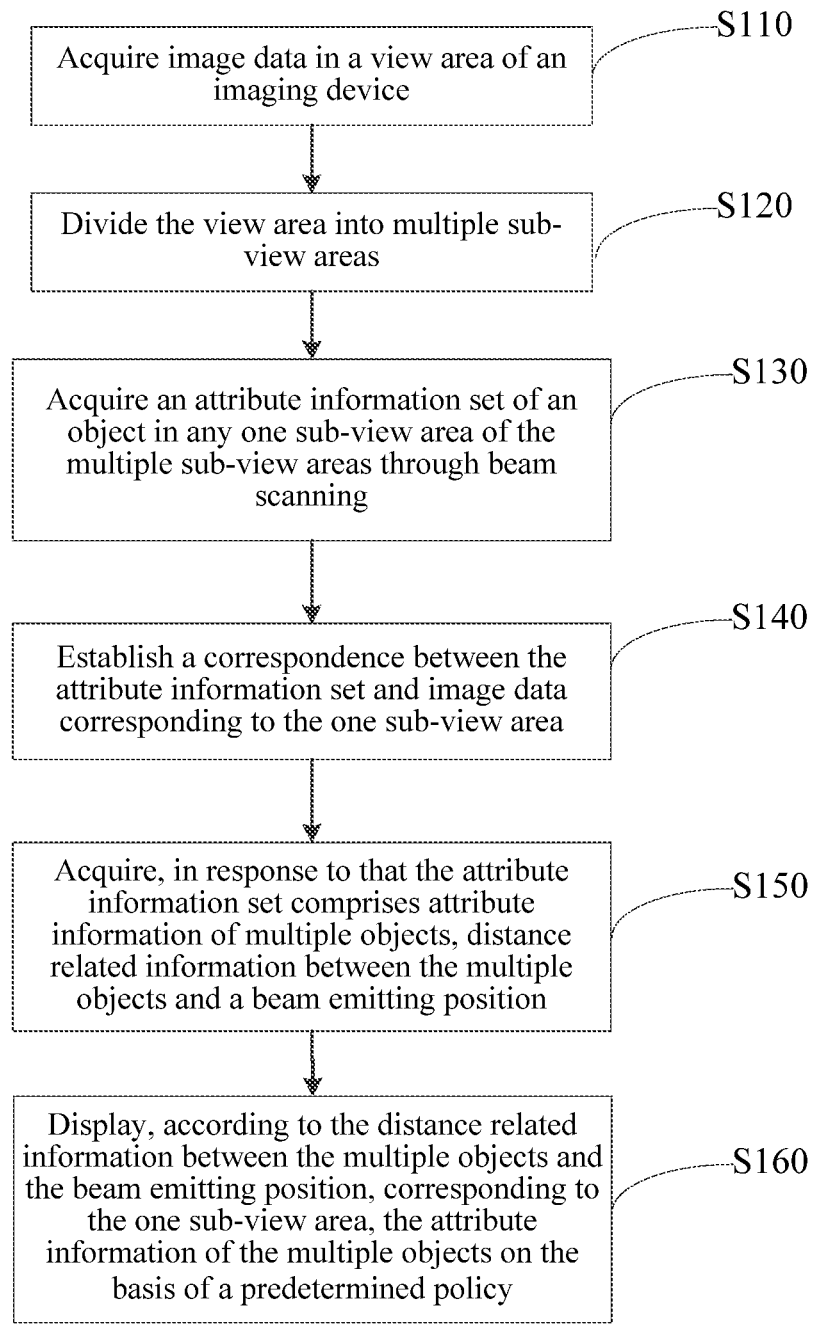
FIG. 6 is an example flowchart of an association method in an example embodiment of the present application.

Referring to FIG. 6, in an example embodiment of the present application, the method may further comprise:

S160: Display, according to the distance related information between the multiple objects and the beam emitting position, corresponding to the one sub-view area, the attribute information of the multiple objects on the basis of a predetermined policy.

In one example embodiment, the displaying the attribute information of the multiple objects on the basis of a predetermined policy comprises: displaying the attribute information of the multiple objects by using multiple font sizes, multiple font colors, multiple font gray levels and/or multiple font types, where the multiple font sizes, multiple font colors, multiple font gray levels and/or multiple font types correspond to the distance related information.

Figure 7:
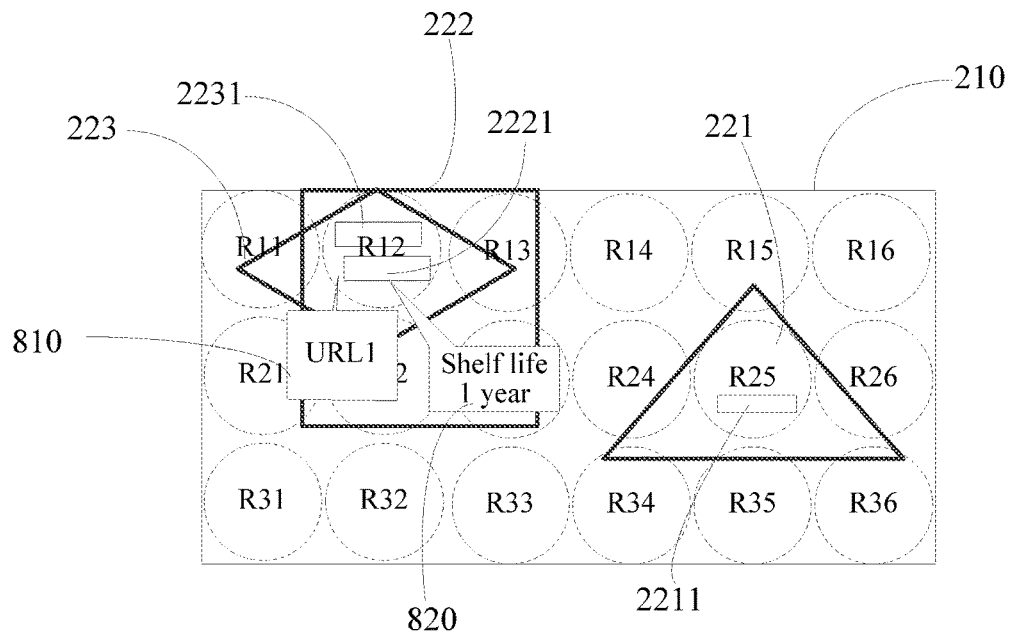
FIG. 7 is an example schematic diagram of displaying attribute information of multiple objects in an example embodiment of the present application.

For example, in a case where attribute information of the multiple objects is displayed by using multiple font sizes corresponding to the distance related information, in response to a case where a distance between an object and the beam emitting position is greater than a distance between another object and the beam emitting position, attribute information of the object is displayed by using a font having a smaller size, and attribute information of the another object is displayed by using a font having a larger size. Referring to FIG. 7, in the method, the attribute information of the second object 222 and the attribute information of the third object 223 may be displayed on a display screen by using fonts having different sizes. Corresponding to that the distance between the second object 222 and the beam emitting position is less than the distance between the third object 223 and the beam emitting position, the font of displaying the attribute information "URL1" of the second object 222 is larger than the font of displaying the attribute information "shelf life 1 year" of the third object 223. In this way, the user may know, according to a blockage relationship of images of objects (the second object 222 blocks the third object 223), that the second object 222 is in front of the third object 223, and at the same time may deduce, according to a relationship of font sizes, that the second object 222 corresponds to the attribute information "URL1", and the third object 223 corresponds to the attribute information "shelf life 1 year". The sub-display area R12 corresponds to the sub-view area 12, and the sub-view area 12 comprises the second object 222 and the third object 223. Accordingly, in the method, a problem in which multiple pieces of attribute information confuse a user easily when multiple objects are comprised in one sub-view area is solved.

Figure 8:
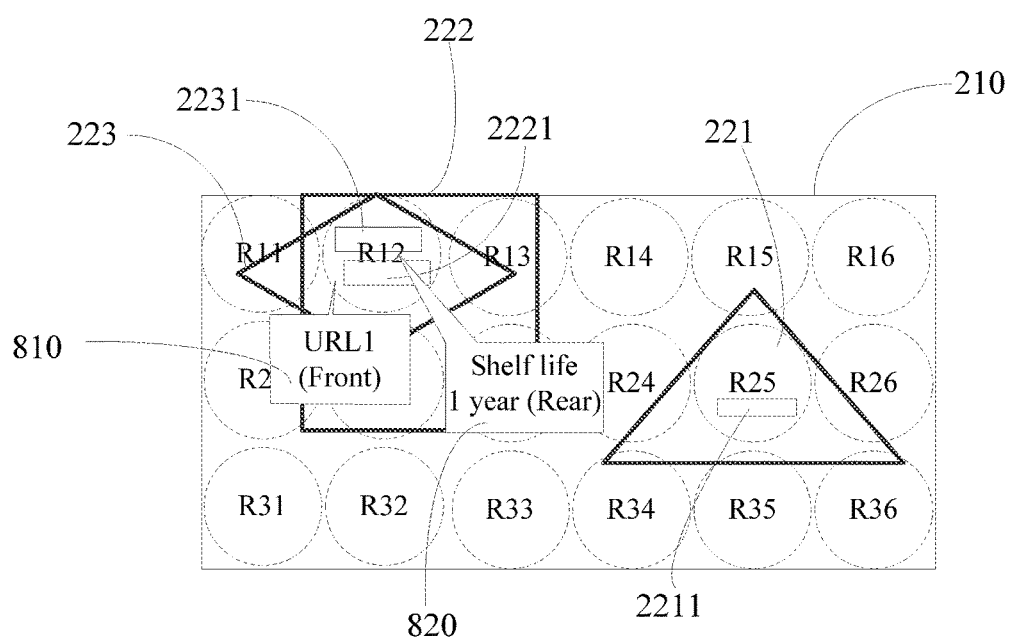
FIG. 8 is an example schematic diagram of displaying attribute information of multiple objects in another example embodiment of the present application.

In another example embodiment, the displaying the attribute information of the multiple objects on the basis of a predetermined policy comprises: displaying the attribute information of the multiple objects, and displaying, corresponding to the attribute information of any one object of the multiple objects, the distance related information between the one object and the beam emitting position. For example, in FIG. 8, "front" may be displayed at the same time when the attribute information "URL1" of the second object 222 is displayed, and "rear" may be displayed at the same time when the attribute information "shelf life 1 year" of the third object 223 is displayed, so as to indicate that the object corresponding to the attribute information "URL1" is in front of the object corresponding to the attribute information "shelf life 1 year". In addition, distance values between corresponding objects and the beam emitting position may also be directly displayed, and the user may determine a front-rear relationship by comparing the distance values.

In addition, the user may be only concerned with attribute information of one object having the shortest distance from the beam emitting position, because other objects may be completely or partially blocked by the object having the shortest distance from the beam emitting position. Therefore, in another example embodiment, the displaying the attribute information of the multiple objects on the basis of a predetermined policy comprises: displaying the attribute information of one object having the shortest distance from the beam emitting position of the multiple objects.

In addition, an embodiment of the present application further provides a computer-readable medium, comprising computer-readable instructions for performing, when being run, the following operations: performing operations of Steps S110 to S160 in the method in the example embodiments shown in FIG. 1 and FIG. 6 above.

In conclusion, in the association method in the example embodiment of the present application, distance related information between multiple objects and a beam emitting position may be acquired in a case where an attribute information set of an object in one sub-view area comprises attribute information of multiple objects, and according to the distance related information, corresponding to the one sub-view area, the attribute information of the multiple objects is displayed on the basis of a predetermined policy, so as to facilitate a user to determine a correspondence between each object of the multiple objects and corresponding attribute information.

Figure 9:
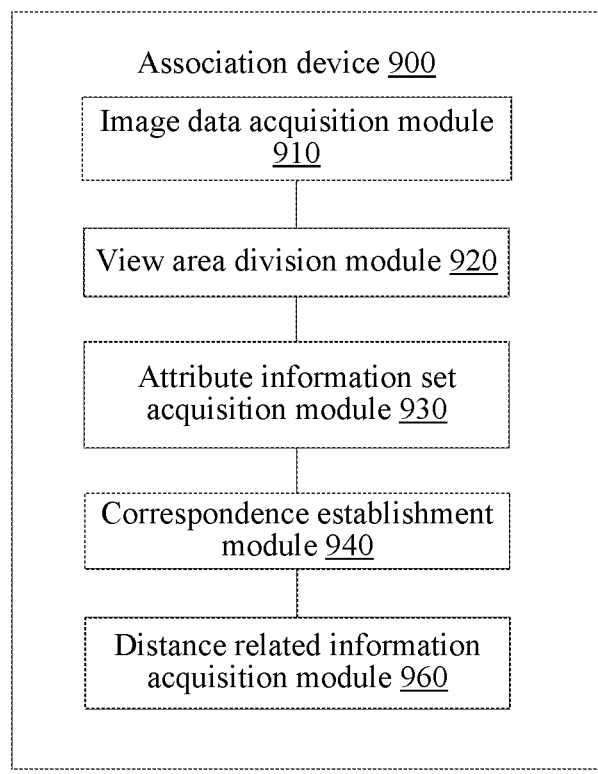
FIG. 9 is an example schematic structural modular diagram of an association apparatus in an embodiment of the present application.

FIG. 9 is a schematic structural modular diagram of the association apparatus in an embodiment of the present application. The association apparatus may comprise an imaging apparatus, or may be disposed independently from an imaging apparatus. The association apparatus may be a smartphone with a camera, which may be a portable camera or a single-lens reflex camera, or may also be a apparatus such as intelligent glasses.

As shown in FIG. 9, the association apparatus 900 comprises:

an image data acquisition module 910, configured to acquire image data in a view area of an imaging apparatus;

a view area division module 920, configured to divide the view area into multiple sub-view areas;

an attribute information set acquisition module 930, configured to acquire an attribute information set of at least one object in any one sub-view area of the multiple sub-view areas through beam scanning;

a correspondence establishment module 940, configured to establish a correspondence between the attribute information set and image data corresponding to the one sub-view area; and a distance related information acquisition module 960, configured to acquire, in response to that the attribute information set comprises attribute information of multiple objects, distance related information between the multiple objects and a beam emitting position.

In the association apparatus in the embodiment of the present application, in an aspect, image data in a view area of the imaging apparatus is acquired, and in an aspect, the view area is divided to obtain multiple sub-view areas; the sub-view area is scanned by using a beam to acquire attribute information of an object in the sub-view area, so as to establish a correspondence between the attribute information of the at least one object in the sub-view area and image data corresponding to the sub-view area; therefore, while image data of an object is acquired, attribute information of the object is correspondingly acquired, and the correspondence between the attribute information and the image data is highly accurate. In addition, in a case where the attribute information set comprises attribute information of multiple objects, the association apparatus acquires distance related information between the multiple objects and a beam emitting position, and the distance related information helps to further determine a correspondence between each object of the multiple objects and corresponding attribute information.

The functions of the image data acquisition module 910, view area division module 920, attribute information set acquisition module 930, correspondence establishment module 940, and distance related information acquisition module 960 are described in detail below with reference to an example embodiment.

The image data acquisition module 910 is configured to acquire image data in a view area of the imaging apparatus.

The imaging apparatus may comprise, for example, a camera, or a CCD. The view area may generally be determined by using a view parameter such as a focal length and a view angle of the imaging apparatus. The schematic sectional view of the view area is shown in FIG. 2, which is no longer elaborated here.

Figure 10:
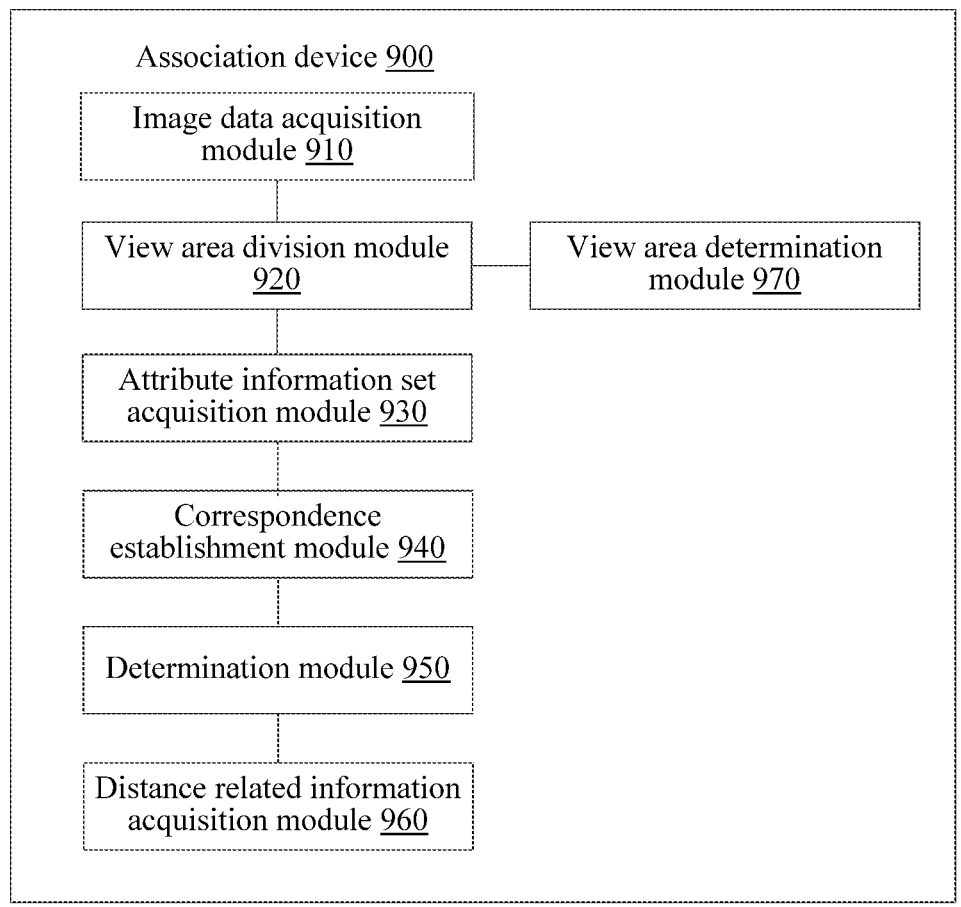
FIG. 10 is an example schematic structural modular diagram of an association apparatus in an example embodiment of the present application.

The view area may be determined according to the view parameter of the imaging apparatus. Referring to FIG. 10, in one example embodiment, the association apparatus further comprises: a view area determination module 970, configured to determine the view area according to a view parameter of the imaging apparatus.

The acquired image data may be a photo or a video obtained through photographing with the imaging apparatus, or may also be an image presented on a display screen of the imaging apparatus before a photo or a video is obtained.

The view area division module 920 is configured to divide the view area into multiple sub-view areas.

A sectional view of the sub-view area is shown in FIG. 3, and a person skilled in the art understands that image data corresponding to each sub-view area is a part of image data in the view area. In addition, to enable the sub-view areas to cover the view area desirably, that is, to enable a beam hereinafter to completely scan the entire view area, in an aspect, an overlapped area may exist between different sub-view areas, and in another aspect, the view area can be divided into as many as possible sub-view areas.

The attribute information set acquisition module 930 is configured to acquire an attribute information set of at least one object in any one sub-view area of the multiple sub-view areas through beam scanning.

Figure 11:
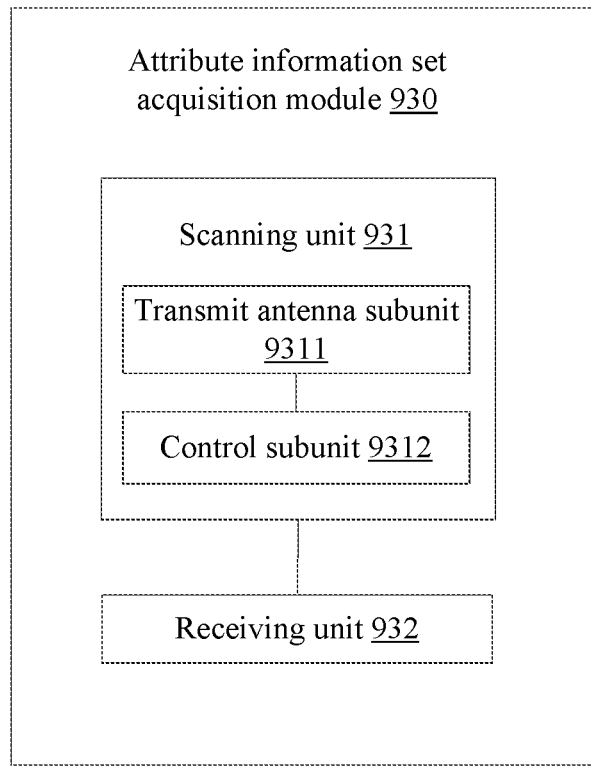
FIG. 11 is an example schematic structural modular diagram of an attribute information set acquisition module in an example embodiment of the present application.

Referring to FIG. 11, in an example embodiment, the attribute information set acquisition module 930 may comprise:

a scanning unit 931, configured to scan the one sub-view area by using a directed beam; and a receiving unit 932, configured to receive attribute information fed back by the at least one object in the one sub-view area according to the scanning of the directed beam, so as to obtain the attribute information set of the at least one object in the one sub-view area.

The scanning unit 931 may comprise:

a transmit antenna subunit 9311, configured to form the directed beam, where the transmit antenna subunit 9311 may comprise: a beam switching antenna, a phased array antenna, an intelligent antenna, and the like; and a control subunit 9312, configured to control the directed beam to scan the one sub-view area.

A coverage area (that is, an area covered by a single time of scanning by a single directed beam) of the directed beam corresponds to the sub-view area. Therefore, to ensure a desirable scanning coverage effect for the entire view area, an area covered by a single time of scanning by the directed beam can be as small as possible, which may be implemented by increasing the number of transmit antennas in the transmit antenna subunit 9311.

In an example embodiment, the receiving unit 932 is configured to receive, through a wireless network, the attribute information fed back by the at least one object in the one sub-view area according to the scanning of the directed beam.

In an example embodiment, the wireless network may comprise at least one of a Wi-Fi network, a Bluetooth network, a ZigBee network, a WiBro network, a cellular network, and a communications module is disposed on any one object of the at least one object. In response to that the communications module receives the directed beam, the communications module sends, to the association apparatus, attribute information of the one object stored in the communications module. In such a case, the attribute information may be related information such as a name, a code, an address of manufacturer, and a date of manufacture of the one object.

In an example embodiment, the wireless network is an RFID network, and an RFID electronic tag is disposed on any one object of the at least one object. In response to that the RFID electronic tag receives the directed beam, the RFID electronic tag sends, to the association apparatus, attribute information of the one object stored in the RFID electronic tag. In such a case, the attribute information is generally address information corresponding to the one object, and according to the address information, the association apparatus may raise a query to acquire more detailed information of the one object. In this case, an RFID reader may be used for the attribute information acquisition module 930.

The correspondence establishment module 940 is configured to establish a correspondence between the attribute information set and image data corresponding to the one sub-view area.

The correspondence between the attribute information set of the object in the sub-view area and the image data corresponding to the sub-view area may be shown in FIG. 4b, and based on the correspondence, a user may conveniently know attribute information of an object in a sub-view area.

The distance related information acquisition module 960 is configured to acquire, in response to that the attribute information set comprises attribute information of multiple objects, distance related information between the multiple objects and a beam emitting position.

Referring to FIG. 10, in an example embodiment, the association apparatus 900 further comprises:

a determination module 950, configured to determine whether the attribute information set comprises the attribute information of multiple objects.

The determination module 950 may determine, according to the number of pieces of the attribute information in the attribute information set, whether the attribute information set comprises the attribute information of multiple objects.

In a case where the attribute information set comprises attribute information of multiple objects, the attribute information of the multiple objects at the same time corresponds to image data corresponding to the one sub-view area, which may confuse a user that the user cannot determine which piece of attribute information corresponds to which object. Therefore, the distance related information acquisition module 960 further acquires distance related information between the multiple objects and a beam emitting position, and may further distinguish, according to the distance related information, the attribute information of multiple objects in the one sub-view area in a direction along the directed beam. The distance related information may be a distance relationship of the multiple objects to the beam emitting position, for example, that a distance between one object and the beam emitting position is greater than a distance between another object and the beam emitting position; or, the distance related information may also be distance values from the multiple objects to the beam emitting position.

Figure 12:
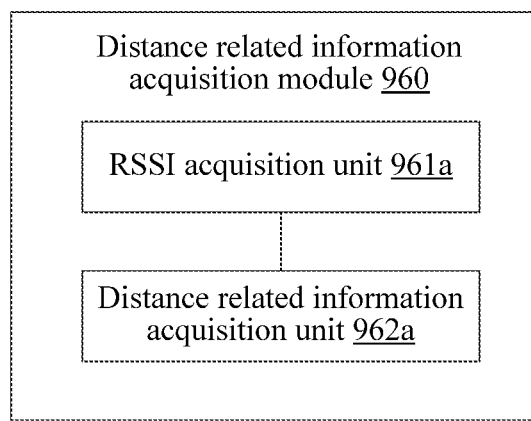
FIG. 12 is an example schematic structural modular diagram of a distance related information acquisition module in an example embodiment of the present application.

Referring to FIG. 12, in an example embodiment, the distance related information acquisition module 960 comprises:

an RSSI acquisition unit 961a, configured to acquire RSSIs separately corresponding to the attribute information of the multiple objects; and a distance related information acquisition unit 962a, configured to acquire, according to the RSSIs separately corresponding to the attribute information of the multiple objects, the distance related information between the multiple objects and the beam emitting position.

Figure 13:
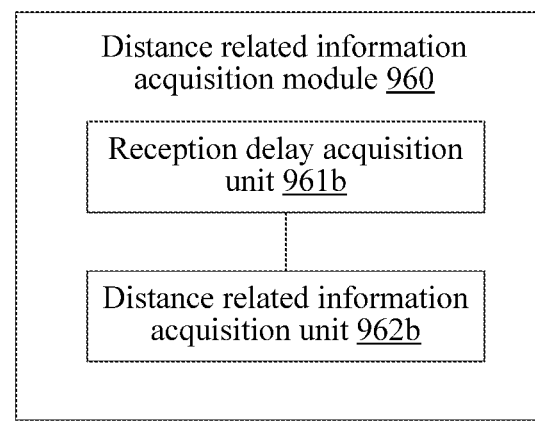
FIG. 13 is an example schematic structural modular diagram of a distance related information acquisition module in another example embodiment of the present application.

Referring to FIG. 13, in another example embodiment, the distance related information acquisition module 960 comprises:

a reception delay acquisition unit 961b, configured to acquire reception delays separately corresponding to the attribute information of the multiple objects; and a distance related information acquisition unit 962b, configured to acquire, according to the reception delays separately corresponding to the attribute information of the multiple objects, the distance related information between the multiple objects and the beam emitting position.

Figure 14:
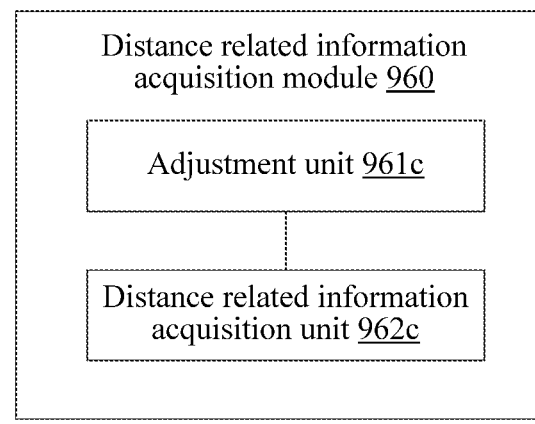
FIG. 14 is an example schematic structural modular diagram of a distance related information acquisition module in another example embodiment of the present application.

Referring to FIG. 14, in another example embodiment, the distance related information acquisition module 960 comprises:

an adjustment unit 961c, configured to adjust emission power of the beam for scanning the one sub-view area; and a distance related information acquisition unit 962c, configured to acquire, according to a condition of receiving the attribute information of the multiple objects in an adjustment process, the distance related information between the multiple objects and the beam emitting position.

Figure 15:
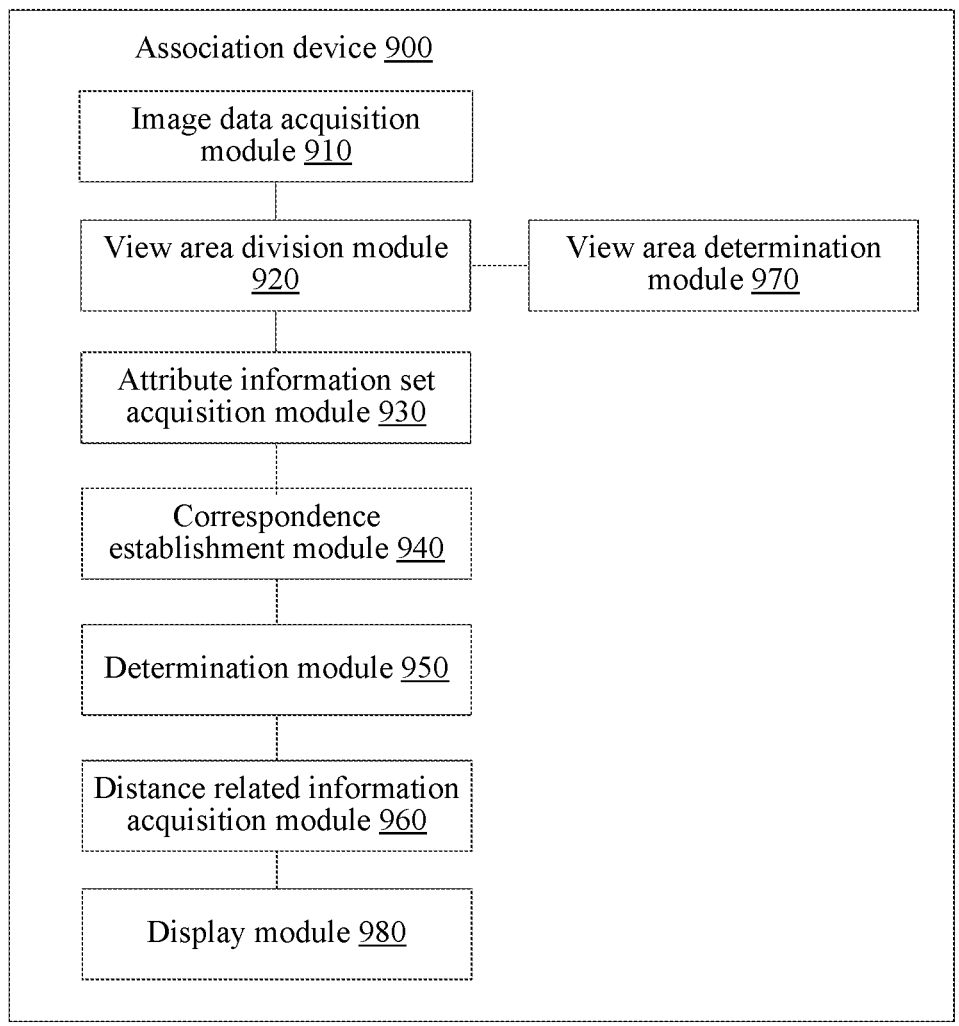
FIG. 15 is an example schematic structural modular diagram of an association apparatus in another example embodiment of the present application.

Referring to FIG. 15, in one example embodiment, the association apparatus 900 further comprises:

a display module 980, configured to display, according to the distance related information between the multiple objects and the beam emitting position, corresponding to the one sub-view area, the attribute information of the multiple objects on the basis of a predetermined policy.

In one example embodiment, the displaying the attribute information of the multiple objects on the basis of a predetermined policy comprises: displaying the attribute information of the multiple objects by using multiple font sizes, multiple font colors, multiple font gray levels and/or multiple font types, where the multiple font sizes, multiple font colors, multiple font gray levels and/or multiple font types correspond to the distance related information.

In another example embodiment, the displaying the attribute information of the multiple objects on the basis of a predetermined policy comprises: displaying the attribute information of the multiple objects, and displaying, corresponding to the attribute information of any one object of the multiple objects, the distance related information between the one object and the beam emitting position.

In addition, the user may be only concerned with attribute information of one object having the shortest distance from the beam emitting position, because other objects may be completely or partially blocked by the object having the shortest distance from the beam emitting position. Therefore, in another example embodiment, the displaying the attribute information of the multiple objects on the basis of a predetermined policy comprises: displaying the attribute information of one object having the shortest distance from the beam emitting position of the multiple objects.

Figure 16:
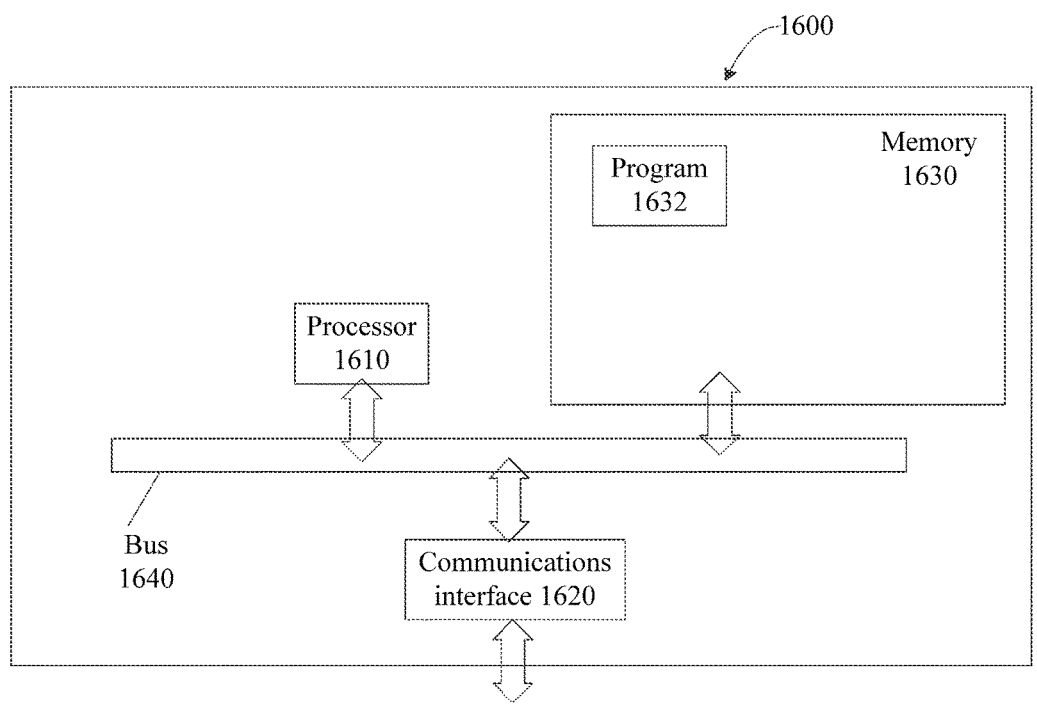
FIG. 16 is an example schematic structural hardware diagram of an association apparatus in an embodiment of the present application.

FIG. 16 shows a hardware structure of the association apparatus in an embodiment of the present application, and the specific embodiments of the present application do not limit the specific implementation of the association apparatus. As shown in FIG. 16, the association apparatus 1600 may comprise:

a processor 1610, a communications interface 1620, a memory 1630, and a communication bus 1640. In this case:

the processor 1610, the communications interface 1620, and the memory 1630 accomplish mutual communications via the communication bus 1640.

The communications interface 1620 is configured to communicate with another network element.

The processor 1610 is configured to execute a program 1632, and specifically, may execute relevant steps in the embodiment of the method shown in FIG. 1 above.

Specifically, the program 1632 may comprise a program code, the program code comprising a computer operation instruction.

The processor 1610 may be a central processing unit CPU, or an application specific integrated circuit ASIC, or be configured to be one or more integrated circuits which implement the embodiments of the present application.

The memory 1630 is configured to store the program 1632. The memory 1630 may comprise a high-speed RAM memory, or may also comprise a non-volatile memory, for example, at least one magnetic disk memory. The program 1632 may specifically be configured to perform the following steps:

acquiring image data in a view area of an imaging apparatus;

dividing the view area into multiple sub-view areas;

acquiring an attribute information set of an object in any one sub-view area of the multiple sub-view areas through beam scanning;

establishing a correspondence between the attribute information set and image data corresponding to the one sub-view area; and acquiring, in response to that the attribute information set comprises attribute information of multiple objects, distance related information between the multiple objects and a beam emitting position.

Reference may be made to the corresponding steps or modules in the foregoing embodiments for the specific implementation of the steps in the program 1632, and will not be described here. It may be clearly known by those skilled in the art that reference may be made to the description of corresponding procedures in the foregoing embodiments of the method for the specific working procedures of the apparatuses and modules described above, and will not be described here in order to make the description convenient and concise.

It can be appreciated by those skilled in the art that each exemplary units and method steps described with reference to the embodiments disclosed in this text can be implemented by electronic hardware or a combination of computer software and electronic hardware. Whether these functions are executed in a hardware mode or a software mode depends on the specific applications and design constraint conditions of the technical solutions. The professional technicians can use different methods to implement the functions described with respect to each specific application, but this implementation should not be considered to go beyond the scope of the present application.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer apparatus (which can be a personal computer, a controller, or network equipment, etc.) to execute all or some steps of the method described in each embodiment of the present application. The foregoing storage medium comprises various media which can store a program code, such as a USB disk, a mobile hard disk, a read-only memory (ROM), a random access memory (RAM), a magnetic disk or a compact disk.

The above example embodiments are only used to describe the present application, without limiting the present application; various alterations and variants can be made by those skilled in the art without departing from the spirit and scope of the present application, so all equivalent technical solutions also belong to the scope of the present application, and the scope of patent protection of the present application should be defined by claims.

What is claimed is:

1. A method for reading radio frequency identification (RFID) tags on commodities, comprising:
   acquiring, by a system comprising a processor, image data representative of an image in a view area of an imaging apparatus;
   dividing the view area into three-dimensional sub-view areas, wherein the three-dimensional sub-view areas are larger than a size of an RFID tag of a commodity of the commodities;
   acquiring an attribute information set of the commodities in a sub-view area of the three-dimensional sub-view areas using beam scanning;
   establishing a correspondence between the attribute information set and the image corresponding to the three-dimensional sub-view areas;
   acquiring, in response to a presence of a group of RFID tags corresponding to a group of the commodities in one of the three-dimensional sub-view areas, respective distances between the group of the commodities and a beam emitting position; and
   presenting, in the image, at least some of the attribute information set of the commodities, wherein the presenting comprises indicating the respective distances between the group of the commodities and the beam emitting position.

2. The method of claim 1, further comprising:
   determining the view area according to a view parameter of the imaging apparatus.

3. The method of claim 1, wherein the acquiring the attribute information set comprises:
   scanning the sub-view area by using a directed beam; and receiving attribute information fed back by the commodities in the sub-view area according to a scanning of the directed beam, so as to obtain the attribute information set.

4. The method of claim 3, wherein the attribute information fed back by the commodities in the sub-view area according to the scanning of the directed beam is received from a network device of a wireless network.

5. The method of claim 4, wherein the wireless network comprises: an RFID network of RFID devices.

6. The method of claim 1, further comprising:
determining, according to a number of pieces of attribute information in the attribute information set, whether the attribute information set comprises the attribute information of the commodities.

7. The method of claim 1, wherein the respective distances between the group of commodities and the beam emitting position are acquired according to received signal strength indications (RSSIs) respectively corresponding to attribute information of the group of commodities.

8. The method of claim 1, wherein the respective distances between the group of commodities and the beam emitting position are acquired according to reception delays respectively corresponding to attribute information of the group of commodities.

9. The method of claim 1, wherein the acquiring the respective distances between the group of commodities and the beam emitting position comprises:
adjusting emission power of the beam for scanning the sub-view area; and
acquiring, according to a condition of receiving attribute information of the group of commodities in an adjustment process, respective distances between the group of commodities and the beam emitting position.

10. The method of claim 1, further comprising:
displaying, according to the respective distances between the group of commodities and the beam emitting position, corresponding to the sub-view area, attribute information of the group of commodities on the basis of a predetermined policy.

11. The method of claim 10, wherein the displaying the attribute information of the group of commodities on the basis of the predetermined policy comprises:
displaying the attribute information of the group of commodities by using font sizes, font colors, font gray levels or font types, and wherein the font sizes, the font colors, the font gray levels or the font types correspond to the respective distances between the group of commodities and the beam emitting position.

12. The method of claim 10, wherein the displaying the attribute information of the group of commodities on the basis of the predetermined policy comprises:
displaying, corresponding to the attribute information of the commodity of the commodities, a distance between the commodity and the beam emitting position.

13. The method of claim 10, wherein the displaying the attribute information of the commodities on the basis of the predetermined policy comprises:
displaying the attribute information of the commodity having a shortest distance from the beam emitting position of the group of commodities.

14. An apparatus for reading radio frequency identification (RFID) tags on commodities, comprising:
a memory that stores executable modules; and
a processor, coupled to the memory, that executes or facilitates execution of the executable modules, comprising:

an image acquisition module configured to acquire image data representative of an image in a view area of an imaging apparatus;
a view area division module configured to divide the view area into multiple three-dimensional sub-view areas, wherein the multiple three-dimensional sub-view areas are larger than a size of an RFID tag of a commodity of the RFID tags of the commodities;
an attribute information set acquisition module configured to acquire an attribute information set of the commodities in any one sub-view area of the multiple three-dimensional sub-view areas through beam scanning;
a correspondence establishment module configured to establish a correspondence between the attribute information set and the image corresponding to one of the multiple three-dimensional sub-view areas;
a distance related information acquisition module configured to acquire, in response to a presence of the RFID tags of the commodities in one of the multiple three-dimensional sub-view areas, distances between the commodities and a beam emitting position; and
a display module configured to present, in the image, the attribute information set of the commodities, wherein the attribute information set comprises an indication of the distances between the commodities and the beam emitting position.

15. The apparatus of claim 14, wherein the executable modules further comprises:
a view area determination module configured to determine the view area according to a view parameter of the imaging apparatus.

16. The apparatus of claim 14, wherein the attribute information set acquisition module comprises:
a scanning unit configured to scan the one sub-view area by using a directed beam; and
a receiving unit configured to receive attribute information fed back by the commodities in the one sub-view area according to the scanning of the directed beam, so as to obtain the attribute information set of the commodities in the one sub-view area.

17. The apparatus of claim 16, wherein the receiving unit is configured to receive, via a wireless network, the attribute information fed back by the commodities in the one sub-view area according to a scanning of the directed beam.

18. The apparatus of claim 14, wherein the attribute information set acquisition module comprises: an RFID reader.

19. The apparatus of claim 14, wherein the executable modules further comprise:
a determination module configured to determine, according to a number of pieces of attribute information in the attribute information set, whether the attribute information set comprises the attribute information of the commodities.

20. The apparatus of claim 14, wherein the distance related information acquisition module comprises:
a received signal strength indications (RSSI) acquisition unit configured to acquire RSSIs separately corresponding to the attribute information of the commodities; and
a distance related information acquisition unit configured to acquire, according to the RSSIs separately corresponding to the attribute information of the commodities, the distance between the commodities and the beam emitting position.

21. The apparatus of claim 14, wherein the distance related information acquisition module comprises:

a reception delay acquisition unit configured to acquire reception delays separately corresponding to the attribute information of the commodities; and a distance related information acquisition unit configured to acquire, according to the reception delays separately corresponding to the attribute information of the commodities, the distance between the commodities and the beam emitting position.

22. The apparatus of claim 14, wherein the distance related information acquisition module comprises:

an adjustment unit configured to adjust emission power of the beam for scanning the one sub-view area; and a distance related information acquisition unit configured to acquire, according to a condition of receiving the attribute information of the commodities in an adjustment process, the distance between the commodities and the beam emitting position.

23. The apparatus of claim 14, wherein the display module is further configured to display, according to the distance between the commodities and the beam emitting position, corresponding to the one sub-view area, the attribute information of the commodities on a basis of a predetermined policy.

24. A computer readable storage device, comprising at least one executable instruction, which, in response to execution, causes an apparatus comprising a processor to perform operations for reading RFID tags on commodities, comprising:

acquiring, by the apparatus, an image in a view area of an imaging apparatus;

dividing the view area into three-dimensional sub-view areas, wherein the three-dimensional sub-view areas are larger than a size of an RFID tag of a commodity of the commodities;

acquiring an attribute information set of the commodities in a sub-view area of the three-dimensional sub-view areas using beam scanning;

establishing a correspondence between the attribute information set and the image corresponding to the three-dimensional sub-view areas;

acquiring, in response to a presence of the RFID tags of the commodities in the sub-view area, respective distances between the RFID tags of the commodities and a beam emitting position; and presenting, in the image, the attribute information set of the commodities, wherein the presenting comprises indicating respective distances between the RFID tags of the commodities and the beam emitting position.

25. An apparatus, characterized by comprising a processor and a memory, the memory storing executable instructions, the processor being connected to the memory via a communication bus, and when the association apparatus operates, the processor executes the executable instructions stored in the memory, so that the apparatus executes operations, comprising:

acquiring, by a system comprising a processor, an image in a view area of an imaging apparatus;

dividing the view area into three-dimensional sub-view areas, wherein the three-dimensional sub-view areas are larger than a size of an RFID tag of a commodity of the commodities;

acquiring an attribute information set of the commodities in a sub-view area of the three-dimensional sub-view areas using beam scanning;

establishing a correspondence between the attribute information set and the image corresponding to the three-dimensional sub-view areas;

acquiring, in response to a presence of RFID tags of the commodities in a sub-view area, a distance between the commodities and a beam emitting position; and presenting, in the image, the attribute information set of the commodities, wherein the presenting comprises indicating the distance between the commodities and the beam emitting position.

\* \* \* \* \*